(12) United States Patent
Saint-Jalmes

(10) Patent No.: US 7,004,542 B2
(45) Date of Patent: Feb. 28, 2006

(54) AIRCRAFT SEAT

(75) Inventor: Bruno Saint-Jalmes, Toulouse (FR)

(73) Assignee: Airbus (FR)

(*) Notice: Subject to any disclaimer, the term of this patent is extended or adjusted under 35 U.S.C. 154(b) by 57 days.

(21) Appl. No.: 10/832,863

(22) Filed: Apr. 27, 2004

(65) Prior Publication Data

US 2004/0201263 A1 Oct. 14, 2004

Related U.S. Application Data

(63) Continuation of application No. 10/454,889, filed on Jun. 5, 2003, now Pat. No. 6,742,743.

(30) Foreign Application Priority Data

Jun. 5, 2002 (FR) .......................................... 02 06887

(51) Int. Cl.
*A47C 3/025* (2006.01)

(52) U.S. Cl. ................................................. 297/284.11
(58) Field of Classification Search ............ 297/284.11, 297/284.1, 312, 331; 244/122 R
See application file for complete search history.

(56) References Cited

U.S. PATENT DOCUMENTS

| 4,334,709 A | * | 6/1982 | Akiyama et al. | 297/284.11 |
| 4,541,669 A | * | 9/1985 | Goldner | 297/284.11 |
| 4,765,679 A | * | 8/1988 | Lanuzzi et al. | 297/300.3 |
| 5,401,077 A | * | 3/1995 | Hosoe | 297/312 |
| 5,435,623 A | * | 7/1995 | Kapec et al. | 297/339 |
| 5,536,067 A | * | 7/1996 | Pinto | 297/284.11 |

* cited by examiner

*Primary Examiner*—Milton Nelson, Jr.
(74) *Attorney, Agent, or Firm*—VanOphem & VanOpem, P.C.

(57) ABSTRACT

An aircraft seat includes a seat cushion and a seat back. The seat cushion has a rear portion along the seat back and a front portion of complementary shape to the rear portion to form a complete seat cushion. The rear portion moves between a raised position and a lowered position. A coupling arrangement connects the front portion to the rear portion so that when the front portion is in the raised position along the seat back the front portion is in the lowered position, in which at least part of it is retracted under the rear portion. When the rear portion is in its lowest position along the seat back the front portion is in a raised, advanced position at the same height as the rear portion to form therewith the seat cushion of the seat for receiving a seated passenger.

8 Claims, 2 Drawing Sheets

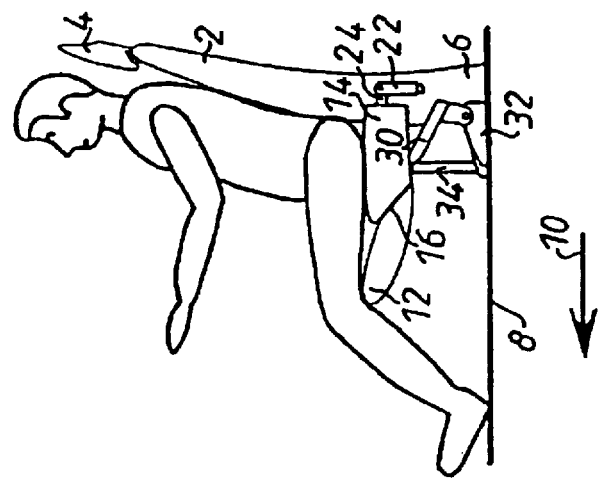
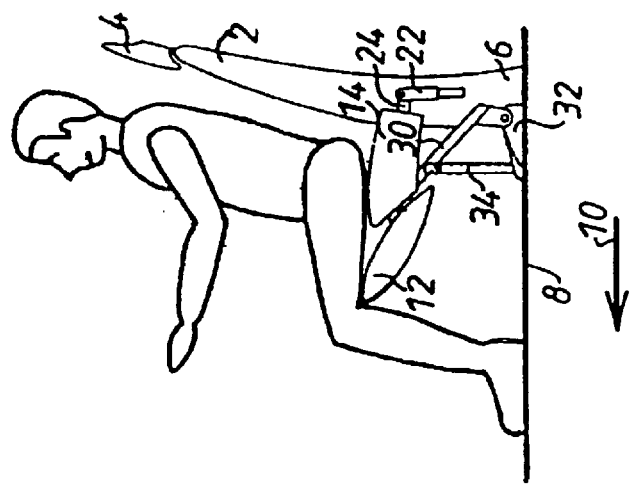
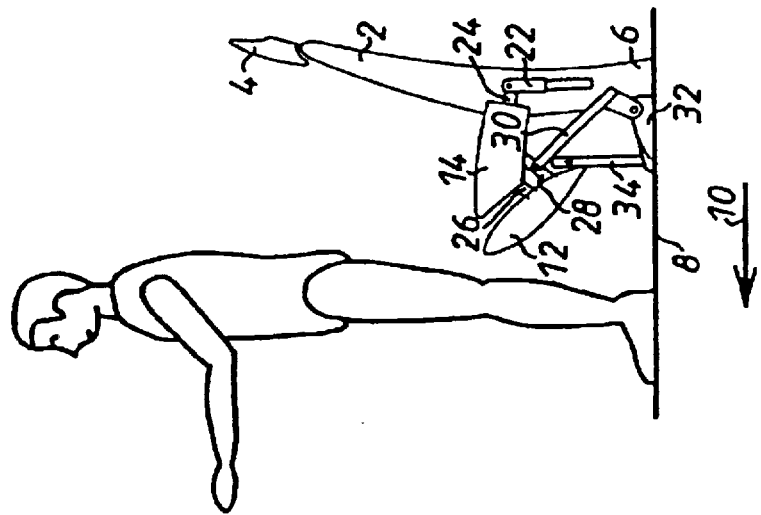

AIRCRAFT SEAT

This application is a continuation of application Ser. No. 10/454,889, filed Jun. 5, 2003 now U.S. Pat. No. 6,742,743.

BACKGROUND OF THE INVENTION

1. Field of the Invention

The present invention relates to a new type of aircraft seat.

2. Description of the Prior Art

Available space in an aircraft is an ongoing problem. To maximize the profit on an aircraft flight, the greatest possible number of passengers must be carried. A seat must be provided for each passenger. The problem then arises of providing the greatest number of seats in a given space, that of the aircraft cabin. It is also necessary for the passengers to be comfortable.

International safety standards impose a minimum space for each passenger. For example, in the event of an accident, if the head of a passenger is thrown forward, it must not strike the back of the seat in front, the passenger being secured by a seat belt, of course. If this standard is only just complied with, the seat cushion occupies two thirds of the distance between two successive seat backs and the remaining third is available for the legs of the seated passenger and for moving around, in particular to access the seat.

In economy class in particular, the small space for moving around between two rows of seats generally prevents natural movement, requiring a passenger to move sideways and to lean over, to adapt to the inclination of the seat backs.

An object of the present invention is to provide a new aircraft seat facilitating movement of passengers between two adjacent rows of seats.

SUMMARY OF THE INVENTION

To this end, the present invention proposes an aircraft seat including a seat cushion and a seat back, wherein the seat cushion has a rear portion along the seat back and a front portion, of complementary shape to the rear portion, to form a complete seat cushion. The rear portion of the seat cushion is mobile between a raised position and a lowered position. Also includes a coupling linkage connecting the front portion of the seat cushion to the rear portion so that when the front portion is in the raised position relative to the seat back at least a part of the front portion is in a lowered position, of the seat cushion under the rear portion, and when the rear portion is in its lowest position relative to the seat back at least a front segment of the front portion is in a raised, advanced position at the same height as the rear portion to form therewith the seat cushion of the seat for receiving a seated passenger.

A seat according to the invention provides more room to move around when the front portion of the seat cushion is retracted under the rear portion, while offering a comfortable seat with good support for the thighs when the front portion is aligned with the rear portion in a fully extended position for seating a passenger.

In one embodiment of a seat according to the invention the rear portion of the seat cushion is adapted to slide along the fixed frame or beam to which the seat back is mounted.

The front portion moves from its lowered (retracted) position to its raised (advanced) position with a movement that is a combination of a movement in translation toward the front and a rotation, for example. It is nevertheless also possible to make provision for only a movement in translation or only a rotation.

In one embodiment, the front portion of the seat is connected to the rear portion by at least two links forming a deformable trapezium and one of these links is connected by a third link to a fixed point.

The front and rear portions of the seat cushion preferably each account for substantially half the surface area of the seat cushion when they are at the same height.

In an advantageous embodiment, the seat includes latching means for latching the rear portion of the seat cushion in its raised position. The seat can then be used for a child, in the manner of a highchair.

For improved resistance to heavy loads, the seat includes a fixed reinforcement disposed substantially vertically underneath it, for example, and the rear portion of the seat cushion has a housing to receive an upper portion of the reinforcement when the rear portion is in its lowered position. The reinforcement can consist of two vertical tubes linked by a transverse bar.

Details and advantages of the present invention will emerge more clearly from the following description given with reference to the accompanying diagrammatic drawings.

BRIEF DESCRIPTION OF THE DRAWINGS

FIGS. 3A to 3C are diagrams showing the movement from the configuration shown in FIG. 1 to the configuration shown in FIG. 2.

DETAILED DESCRIPTION OF THE PREFERRED EMBODIMENT

Figure 1:
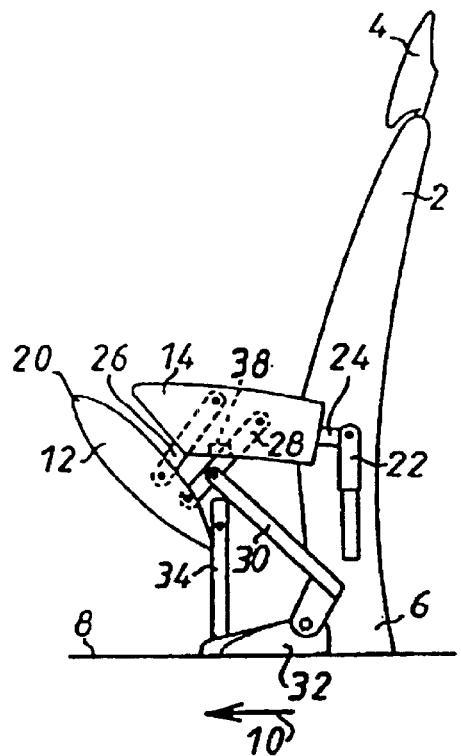
FIG. 1 is a side view of a seat according to the invention in a "rest" configuration.

The aircraft seat shown in the figures includes a seat cushion in two parts, a seat back 2 with a headrest 4 at the top, and legs 6.

The seat has two legs 6 supporting the seat back 2 and the seat cushion. The legs are aligned with the seat back 2. For example, the seat can include two facing and substantially vertical beams fixed to the floor at the bottom. The bottom portion of the beams, close to the floor, then serves as a base for the seat, and the upper portion is used to fix the seat back 2.

The seat shown in the drawings is fixed to the horizontal floor 8 of an aircraft cabin. An arrow 10 indicates the direction of movement of the aircraft in flight and defines a longitudinal axis. Thus in the figures the forward direction is to the left and the rearward direction is to the right.

Figure 2:
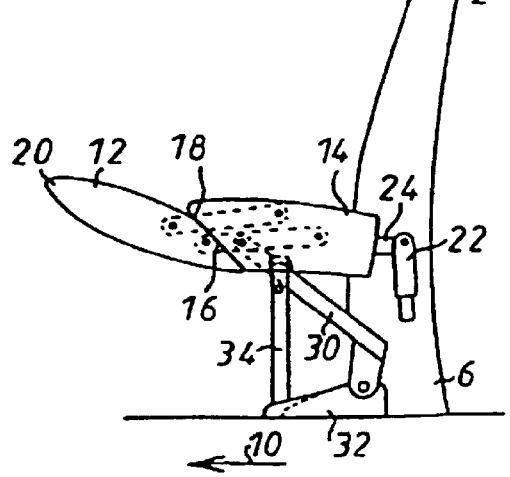
FIG. 2 is a side view of the FIG. 1 seat in an "in use" configuration.

The seat cushion has a front portion 12 and a rear portion 14. The two portions 12 and 14 have complementary shapes to form a complete seat cushion as shown in FIG. 2. The junction surface between the front and rear portions 12 and 14 of the seat cushion is substantially plane. This junction plane 16 is inclined at approximately 45°. It extends upward in the direction from the rear upwards to the front and forms a seat cushion junction line 18 transverse of the seat and substantially parallel to the seat back 2. The distance between the junction line 18 and the seat back 2 is substantially equal to the distance between the junction line 18 and the front edge 20 of the seat cushion, which is the most forward portion of the seat cushion when the front portion of the seat cushion is fully extended forward.

As can be seen in the figures, the front and rear portions 12 and 14 are mobile relative to each other and also relative to the fixed seat back 2.

The rear portion 14 of the seat cushion can move in substantially vertical translation along the bottom portion of the seat back 2. On each side of the seat, at the level of the top portion of the legs 6, there is a pneumatic cylinder 22. Each pneumatic cylinder 22 is fixed at the bottom end to the corresponding leg 6 and at the top end to an attachment lug 24 fastened to the rear portion 14 of the seat cushion. The rear portion 14 can be guided on the seat back 2 by co-operation of matching shapes of the rear portion 14 and the seat back 2, for example. Alternatively, guide fingers can be provided on the rear portion 14, each sliding in a corresponding groove in the beams forming the legs 6 and supporting the seat back 2, for example.

The front portion 12 of the seat cushion is connected to the rear portion 14 by links. It is possible to provide a single set of links situated substantially in the median longitudinal plane of the seat or two sets of links symmetrically placed relative to that median longitudinal plane. In the latter case, the links are then on the sides of the seat, for example, but in this case they are preferably streamlined to prevent pinching fingers or objects. Other solutions can also be foreseen. However, configurations in which the seat is substantially symmetrical relative to its median longitudinal plane are preferred. The remainder of the description applies to only one set of links.

Thus the front portion 12 is connected to the rear portion 14 by a top link 26 and a bottom link 28. The links 26 and 28 are both disposed in a longitudinal vertical plane and define a trapezium. A first end of each link is attached to and pivots on the rear portion 14 of the seat cushion and the other end of each link is attached to and pivots on the front portion 12 of the seat cushion. The respective attachment points of the top link 26 to the rear portion 14 and the front portion 12 are higher than the points of attachment of the bottom link 28 to the rear portion 14 and the front portion 12, respectively.

Accordingly, the relative movement between the rear portion 14 and the front portion 12 is a combination of rotation and translation movement. As can be seen in FIGS. 1 and 2, in the "in use" configuration (FIG. 2) the front portion 12 is almost horizontal and in front of the rear portion 14 and in the "rest" configuration (FIG. 1) the front portion 12 is retracted relative to the rear portion 14 and at least part of it is under the latter.

The lengths of the links and the positions of the attachment points are chosen so that in a first position the front portion 12 cooperates with the rear portion 14 to form a seat cushion and in the rest position at least part of the front portion 12 is retracted under the rear portion 14.

Note that, as shown in the FIGURES, the bottom link 28 is connected by a third link 30 to a base 32. This connection to the floor couples the movement of the rear portion 14 relative to the seat back 2 with the relative movement of the front and rear portions 12 and 14 of the seat cushion.

Figure 4:
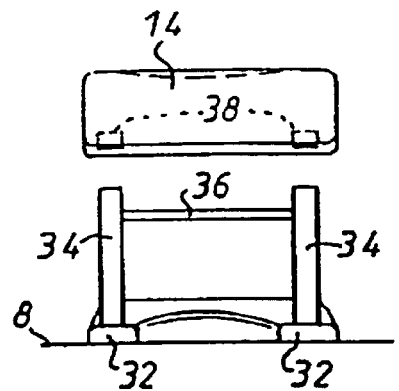
FIG. 4 is a partial front view of the seat shown in FIG. 1.

The base 32 also carries a reinforcement formed by two vertical tubes 34 linked by a transverse bar 36. FIG. 4 is a front view of the reinforcement. Note that, as shown in FIG. 4 and FIG. 1, the rear portion 14 of the seat cushion has two housings 38 facing the free top ends of the tubes 34. The housings 38 are formed in the structure of the rear portion 14 of the seat cushion. The tubes 34 are relatively far back, so that they do not impede the movement of the front portion 12 of the seat cushion. Their height is such that when the rear portion 14 is in its lowest position (see FIGS. 2 and 3C), the free ends of the tubes 34 are in the housings 38.

How the seat works is described hereinafter with reference to FIGS. 3A to 3C.

In FIG. 3A, the seat is in the rest or retracted configuration and a passenger is about to sit on it. The rear portion 14 of the seat cushion is in its highest position. This position can be defined in various ways, for example stop(s) on the seat back and/or the seat cushion, end of travel stops on the pneumatic cylinders 22, etc. The front portion 12 of the seat cushion is retracted under the rear portion 14. This position is defined by the lengths of the links 26, 28 and 30 and by the position of the attachment points of the links. The pneumatic cylinders 22 apply a spring return force to the rear portion 14 of the seat cushion in this highest position of the rear portion 14. Here the front portion 12 of the seat cushion can come into contact with the tubes 34 of the reinforcement placed under the seat. If necessary, the reinforcement can limit the movement of the front and rear portions 12 and 14 of the seat cushion and thereby form the stop(s) defining the highest position of the rear portion 14 and the retracted position of the front portion 12.

When the passenger begins to sit down (see FIG. 3B), he first comes into contact with the rear portion 14. The passenger's weight applies a force in opposition to the force exerted by the pneumatic cylinders 22, and the rear portion 14 of the seat cushion therefore descends. Because of the third link 30, the bottom link 28 is pushed upward, entraining the front portion 12 of the seat cushion. The front portion 12 then moves forward and pivots until it is virtually horizontal. The pneumatic cylinders 22 damp the downward movement of the passenger.

When the passenger is entirely seated (see FIG. 3C), his weight is supported primarily by the rear portion 14 of the seat cushion, which is in its lowest position, which can be defined in various ways, for example by stop(s) limiting the downward movement in translation of the rear portion 14 of the seat cushion. These stop(s) can be integrated into the pneumatic cylinders 22 and/or the seat back 2 and/or the legs 6 and/or the rear portion 14. Alternatively, the same effect can be obtained when the front portion 12 is positioned relative to the rear portion 14 to form a complete seat cushion, or by the reinforcement under the seat, when the tubes 34 come into contact with the bottom of the corresponding housings 38.

In this position (see FIG. 3C), the reinforcement of the tubes under the seat assists it to absorb high forces. The transverse bar 36, by linking the two tubes 34, also increases the resistance of the seat to side loads. Thus the seat can absorb longitudinal accelerations of 16 g and transverse accelerations of 7 g (1 g =9.81 ms$^{-2}$).

In a different embodiment, latching means can be provided to latch the seat in its rest position (see FIGS. 1 and 3A), in which the rear portion 14 of the seat cushion is in the raised position and the front portion 12 is retracted under the rear portion 14. There can be multiple latches. For example, latches can be integrated into the pneumatic cylinders 22 to prevent the rear portion 14 from descending. There can also be a latch to prevent the rear portion 14 of the seat cushion from descending. The link 30 can also be latched. In this latter case, the latching means are advantageously provided with foot-operated control means.

Latching the seat in its rest position enables the seat to be used for a child. The child is then seated only on the rear portion 14 and is therefore raised up. Moreover, in this position the length of the seat cushion being limited to the rear portion is better suited to the size of a child. Thus young passengers can travel much more comfortably than on conventional prior art seats.

The seat according to the invention is as comfortable for a passenger as a conventional aircraft seat. When seated, the distance between the front edge 20 of the seat cushion and the seat back 2 can be identical to that of a conventional seat. The passenger therefore has the benefit of equivalent thigh support. When he is not seated, the passenger has more room to move around, for example to take off a garment, or to place a bag in a luggage locker, etc.

If the space between two successive seats is too small, deep vein thrombosis problems can arise on long-haul flights. A seated passenger lacks room to move around and his blood does not circulate properly in the legs. A thrombosis can then result. A seat according to the invention can help to solve these problems. The passenger has more room when he stands up. He can then move around, for example squat, without disturbing his neighbors. This exercise encourages blood circulation and prevents thrombosis.

The movement of the seat cushion does not disturb the passenger when he sits down or stands up. He has no need to perform any particular gesture for the seat cushion to be positioned correctly, unlike conventional folding seats, in which the whole seat cushion pivots from its substantially horizontal position of use to a substantially vertical rest position along the seat back. With conventional seats, movement of the seat cushion toward its horizontal position must be started with the hand before the passenger can sit down.

The seat according to the invention has the advantage of assisting the passenger to sit down. The passenger comes into contact with the seat sooner and the last phase of his descent is damped, especially if the seat incorporates spring means.

Like aircraft seats in general, a seat according to the invention can accommodate a life vest. The mechanism of the seat is compact and leaves a large free space under the seat, both in the rest configuration and in the in use configuration. This free space can also be used for the comfort of passengers and can provide space for the feet of the passenger seated on the seat or the feet of a passenger seated behind the seat.

Because of the increased room to move around between rows of seats, when the seats are not occupied embarkation and disembarkation times can be reduced. Passengers can move around more easily and therefore faster.

Other advantages are that, the flight crew and passengers can be served more easily, especially when the aircraft has at least two aisles. If one of the aisles is temporarily blocked and there is at least one row of empty seats between the aisles, it is easy to move from one aisle to the other, even with a trolley (or cart).

The present invention can be applied to seats of any shape. The mechanism described above can be adapted to suit virtually all seats. For simplicity, no armrests are shown in the drawings. Armrests can nevertheless be provided, either fastened to the seat cushion, preferably to the rear portion thereof, or to the seat back (or the legs).

The present invention is not limited to the preferred embodiment described above by way of non-limiting example. To the contrary, it encompasses all embodiments within the scope of the following claims.

For example, other kinematic systems could be envisaged between the rear portion and the front portion of the seat cushion. The top and bottom links could form a parallelogram, for example. In this case, the relative movement between the two portions of the seat cushion would be a movement in translation only. Alternatively, a single link could be provided between the two portions of the seat cushion. Other mechanisms with a return point, like a swing, could be envisaged.

The movement of the front portion of the seat cushion being linked to the movement of the rear portion, the spring return forces can equally well be exerted on the front portion of the seat cushion or on a mechanism connecting the two portions of the seat cushion to spring-load the rear portion toward its raised position. The spring return means are optional. Obviously means for returning the seat cushion to the rest position are advantageous. Instead of providing spring means (pneumatic cylinders, springs, etc.), other means can also be envisaged (offset centre of gravity, counterweight, etc.).

What is claimed is:

1. An aircraft seat for an aircraft cabin, said aircraft seat comprising:

a frame member;

a seat back mounted to said frame member;

a seat cushion having a rear portion movably mounted to one of said seat back and said frame member and a front portion mounted adjacent said rear portion, said front portion having a front end segment and a rear end segment opposite said front end segment;

means for biasing said rear portion of said seat cushion between a raised position and a lowered position, said means for biasing mounted between said rear portion of said seat cushion and said frame member;

means for moving said front portion of said seat cushion from a first lower retracted position to a second raised extended position whereby in said first lower retracted position said rear end segment of said front portion of said seat cushion is moved substantially underneath said rear portion of said seat cushion and in said second extended position, said front portion is moved to fully extend such that said front end segment of said front portion of said seat cushion is moved to extend from said rear portion at substantially the same height as said rear portion of said seat cushion to provide a seat for a passenger.

2. The aircraft seat as claimed in claim 1 wherein said means for biasing is a spring.

3. The aircraft seat as claimed in claim 1 wherein said means for biasing is a pneumatic cylinder.

4. The aircraft seat as claimed in claim 1 wherein said means for moving said front portion of said seat cushion further comprises a four-bar linkage connecting said rear portion of said seat cushion with said front portion of said cushion; and a fixed link member having one end fixed to a floor for said aircraft cabin and an opposite end attached to at least one link of said four-bar linkage.

5. The aircraft seat as claimed in claim 1 wherein the movement of said front portion of said cushion from said first lower retracted position to said second raised extended position is a combination of a movement in translation in a forward direction and a rotation.

6. The aircraft seat as claimed in claim 1 further comprising means for supporting said rear portion of said seat cushion when said rear portion is in said lowered position.

7. The aircraft seat as claimed in claim 1 wherein said means for biasing said rear portion of said seat cushion biases said rear portion of said seat cushion towards said raised position.

8. The aircraft seat as claimed in claim 7 further comprising means for latching said rear portion of said seat cushion at said raised position.

* * * * *

UNITED STATES PATENT AND TRADEMARK OFFICE
CERTIFICATE OF CORRECTION

PATENT NO. : 7,004,542 B2
APPLICATION NO. : 10/832863
DATED : February 28, 2006
INVENTOR(S) : Bruno Saint-Jalmes It is certified that error appears in the above-identified patent and that said Letters Patent is hereby corrected as shown below:

In the Title, Line 54, before "AIRCRAFT", kindly insert --AN--.

In Column 1, Line 46, after "position" kindly insert --,--.

In Column 1, kindly insert the following paragraph between Line 58 and Line 59. --In one advantageous embodiment, spring means spring-load the rear portion of the seat into its raised position, enabling the seat to function "automatically", i.e. without the passenger having to concern himself with the position of the seat cushion.--

Signed and Sealed this

Fifteenth Day of August, 2006

JON W. DUDAS
*Director of the United States Patent and Trademark Office*